US006977615B2

(12) United States Patent
Brandwein, Jr.

(10) Patent No.: US 6,977,615 B2
(45) Date of Patent: Dec. 20, 2005

(54) MICROSTRIP ANTENNA FOR RF RECEIVER

(75) Inventor: Richard Paul Brandwein, Jr., Lisle, IL (US)

(73) Assignee: Omron Automotive Electronics, Inc., Saint Charles, IL (US)

( * ) Notice: Subject to any disclaimer, the term of this patent is extended or adjusted under 35 U.S.C. 154(b) by 0 days.

(21) Appl. No.: 10/792,398

(22) Filed: Mar. 4, 2004

(65) Prior Publication Data

US 2005/0195125 A1   Sep. 8, 2005

(51) Int. Cl.$^7$ .............................................. H01Q 1/38
(52) U.S. Cl. ............................. 343/700 MS; 343/895; 343/846
(58) Field of Search ..................... 343/895, 700 MS, 343/702, 846, 848

(56) References Cited

U.S. PATENT DOCUMENTS

| | | | |
|---|---|---|---|
| 3,999,503 A | 12/1976 | Brannis et al. ............ 116/34 R |
| 4,082,960 A | 4/1978 | Denamps et al. ............ 307/118 |
| 4,319,220 A | 3/1982 | Pappas et al. ................ 340/58 |
| 4,609,905 A | 9/1986 | Uzzo ............................ 340/58 |
| 4,987,783 A | 1/1991 | D'Antonio et al. ........ 73/862.64 |
| 5,279,163 A | 1/1994 | D'Antonio et al. ............ 73/728 |
| 5,453,752 A | 9/1995 | Wang et al. .......... 343/700 MS |
| 5,589,639 A | 12/1996 | D'Antonio et al. ............ 73/724 |
| 5,602,540 A | 2/1997 | Spillman, Jr. ........... 340/870.37 |
| 5,712,647 A | 1/1998 | Shively ....................... 343/895 |
| 5,927,240 A | 7/1999 | Maxon ..................... 123/179.3 |
| 5,936,583 A | 8/1999 | Sekine et al. ................ 343/702 |
| 6,018,298 A | 1/2000 | Endo et al. ............... 340/572.5 |
| 6,195,858 B1 | 3/2001 | Ferguson et al. .......... 29/25.42 |
| 6,295,029 B1 | 9/2001 | Chen et al. .......... 343/700 MS |
| 6,373,447 B1 | 4/2002 | Rostoker et al. ............ 343/895 |
| 6,480,162 B2 | 11/2002 | Sabet et al. ................ 343/767 |
| 6,518,877 B1 | 2/2003 | Starkey et al. .............. 340/447 |
| 6,546,982 B1 | 4/2003 | Brown et al. ............. 152/152.1 |
| 6,600,896 B2 | 7/2003 | Chadwick et al. .......... 455/3.01 |
| 6,617,975 B1 | 9/2003 | Burgess .................. 340/815.47 |
| 6,630,885 B2 | 10/2003 | Hardman et al. ........... 340/505 |
| 6,636,180 B2 | 10/2003 | Lin et al. ............. 343/700 MS |
| 6,664,932 B2 | 12/2003 | Sabet et al. ................. 343/770 |
| 6,670,886 B1 | 12/2003 | Lin ............................. 340/447 |
| 6,856,294 B2 * | 2/2005 | Kadambi et al. ........... 343/702 |

OTHER PUBLICATIONS

Jung et al., Tilt Beam Characteristic by Changing Length of Finite-Sized Square Dielectric Substrate of One Arm Rectangular Spiral Antenna, Department of Electrical and Computer Engineering University of California, Irvine, USA.

MICRF007 [online]; [retrieved on Dec. 10, 2003]. Retrieved from the Internet: <URL:http://216.239.39.104/search?q=cache:ATXybO61SIIJ:www.micrel>.

Motorola Reference Design Accelerates Development of Applications Using RF Technology. Motorola Mediacenter—Press Releases [online] [retrieved on Dec. 12, 2003]. Retrieved from the Internet: <URL: http://www.motorola.com/mediacenter/news/detail/0,,1359_1027_...>.

(Continued)

*Primary Examiner*—Hoang V. Nguyen
(74) *Attorney, Agent, or Firm*—Foley & Lardner LLP

(57) ABSTRACT

An antenna arrangement for a RF (radio frequency) signal, has: printed circuit board having first and second opposed sides; a ground plane formed on the first side of the printed circuit board; a circuit disposed on the second side of the printed circuit board; and a flat, polygonal shaped spiral member disposed on the second side of the printed circuit board, the polygonal shaped spiral member a first free end a second connection end connected to the circuit, the spiral member having a plurality of straight portions which are interconnected to form a plurality of corners.

22 Claims, 5 Drawing Sheets

OTHER PUBLICATIONS

Design of Printed Spiral Antennas Using a Moment Method Running Under a Genetic Algorithm Optimisation Routine [online], University of Sheffield, [retrieved on Dec. 12, 2003]. Retrieved from the Internet: <URL: http://www.shef.ac.uk/eee/ecs/mcomms/spiralant.html>.

ETS LINDGREN, Model 3101, 3102 and 3103 Conical Log-Spiral Antennas Manual, EMC Test Systems, L.P., Sep. 2002, Rev A—PN 399276.

Melexis Microelectronic Integrated Systems, EVB71101 315/433MHz Receiver Evaluation Board Description, Aug. 2003, Rev. 006, pp. 1-16.

MICREL, QuikRadio RF Receiver/Demodulator Handbook, MICRF001, MICRF011, MICRF002/RF022, MICRF003/RF033, Dec. 1998, CA, USA.

* cited by examiner

MICROSTRIP ANTENNA FOR RF RECEIVER

FIELD OF THE INVENTION

The present invention relates generally to antenna and more specifically to a microstrip antenna for an RF receiver suitable for use in compact arrangements.

BRIEF DESCRIPTION OF THE RELEVANT ART

In the past, systems have used printed trace antennas or separate antenna components which are attached to the PCB (Printed circuit board). However, these arrangements have suffered from drawbacks such as the component antenna increasing cost, weight and suffering from the tendency for failure when used in an RF system. The printed antennas, on the other hand, have space consuming configurations. One example of these is the conical configuration is three dimensional and tends to consume a lot of space and has thus proven problematical when applied in situations wherein space is at a premium such as in automotive keyless entry and tire pressure monitoring systems.

SUMMARY OF THE INVENTION

The present invention is directed to a spiral shape antenna which can be printed directly on a PCB and which exhibits improved performance characteristics with respect to the conventional printed type antenna such as the above-mentioned spiral configuration.

More specifically, a first aspect of the invention resides in an antenna arrangement for a RF (radio frequency) signal, comprising: printed circuit board having first and second opposed sides; a ground plane formed on the first side of the printed circuit board; a circuit disposed on the second side of the printed circuit board; and a flat, polygonal shaped spiral member disposed on the second side of the printed circuit board, the polygonal shaped spiral member a first free end a second connection end connected to the circuit, the spiral member having a plurality of straight portions which are interconnected to form a plurality of corners.

In accordance with this aspect of the invention the polygonal shaped spiral member comprises a square spiral and wherein the plurality of corners are sharp corners. Further, the length of the square spiral can be less than quarter wave length of the RF which the antenna is adapted to receive.

The length to width ratio of the antenna can be about 1/20. The circuit is connected to the connection end in a manner which minimizes the distance therebetween. In a specific instance the RF is about 315 MHz and the wavelength is approximately one meter.

This aspect of the invention can further comprise a transmitter which is adapted to transmit a signal from a remote location to the antenna. This portable transmitter is adapted to carried by a person and comprises a transmitter circuit and a loop antenna which is disposed about a periphery of the transmitter circuit.

In a specific instance the spiral antenna arrangement is disposed in a door of a vehicle and operatively connected with a door lock mechanism to enable keyless unlocking of the vehicle door. In an alternate arrangement, the transmitter is disposed in a wheel of a vehicle and operatively connected with a pressure sensor to transmit data indicative of the pneumatic pressure within a tire on the wheel, to the antenna which is mounted in the vehicle to which the wheel is operatively connected.

A second aspect of the invention resides in a remote control arrangement comprising: a rectangular spiral antenna having a free end and connection end; and a circuit operatively connected to the connection end and adapted to operate a device in response to a signal being received by the antenna.

In accordance with this aspect, a circuit board and the antenna are disposed on the circuit board. The circuit is a printed circuit which is printed on first side of the circuit board. The antenna is printed on the first side of the circuit board while a ground plane is formed on a second side of the circuit board which is opposite from the first side on which the antenna is printed.

In a specific instance, the circuit board is disposed in a vehicle such as in a door of the vehicle.

This second aspect also comprises a portable transmitter which is adapted to transmit a signal to the antenna on the circuit board. This portable transmitted is adapted to be carried by a person and manually manipulated to generate the signal to the antenna. However, in a variation of this aspect, the portable transmitter is adapted to be disposed with a wheel of a vehicle and to be responsive to a pressure sensor which senses the pneumatic pressure in a tire on the wheel, and to transmit a signal indicative of the sensed pressure to the antenna on the circuit board.

Another aspect of the invention resides in a method of improving reception of a rectangular spiral antenna which is disposed on a circuit board and adapted to receive a signal from a remote transmitter, comprising providing sharp corners at the intersections which interconnect straight portions of the rectangular spiral antenna. This method can include providing at least one straight portion of the antenna with a saw tooth configuration which increases the number of sharp corners on the antenna.

This aspect of the invention further includes disposing the antenna and a circuit on the same side of a circuit board, and connecting an end of the antenna to the circuit to minimize the distance between the antenna and the circuit. In addition, this aspect includes disposing a ground plane on a side of the circuit board which is opposite to the side on which the antenna and the circuit are disposed.

In addition to the above, it is within the scope of this aspect to transmit a signal to the antenna using a loop antenna which is disposed about the periphery of a transmitter. The step of transmitting can comprise isotropic signal transmission.

BRIEF DESCRIPTION OF THE DRAWINGS

The various merits and advantages of the invention will be come more clearly appreciated as a detailed description is given with reference to the appended drawings wherein.

DETAILED DESCRIPTION OF THE EXEMPLARY EMBODIMENTS

Figure 1:
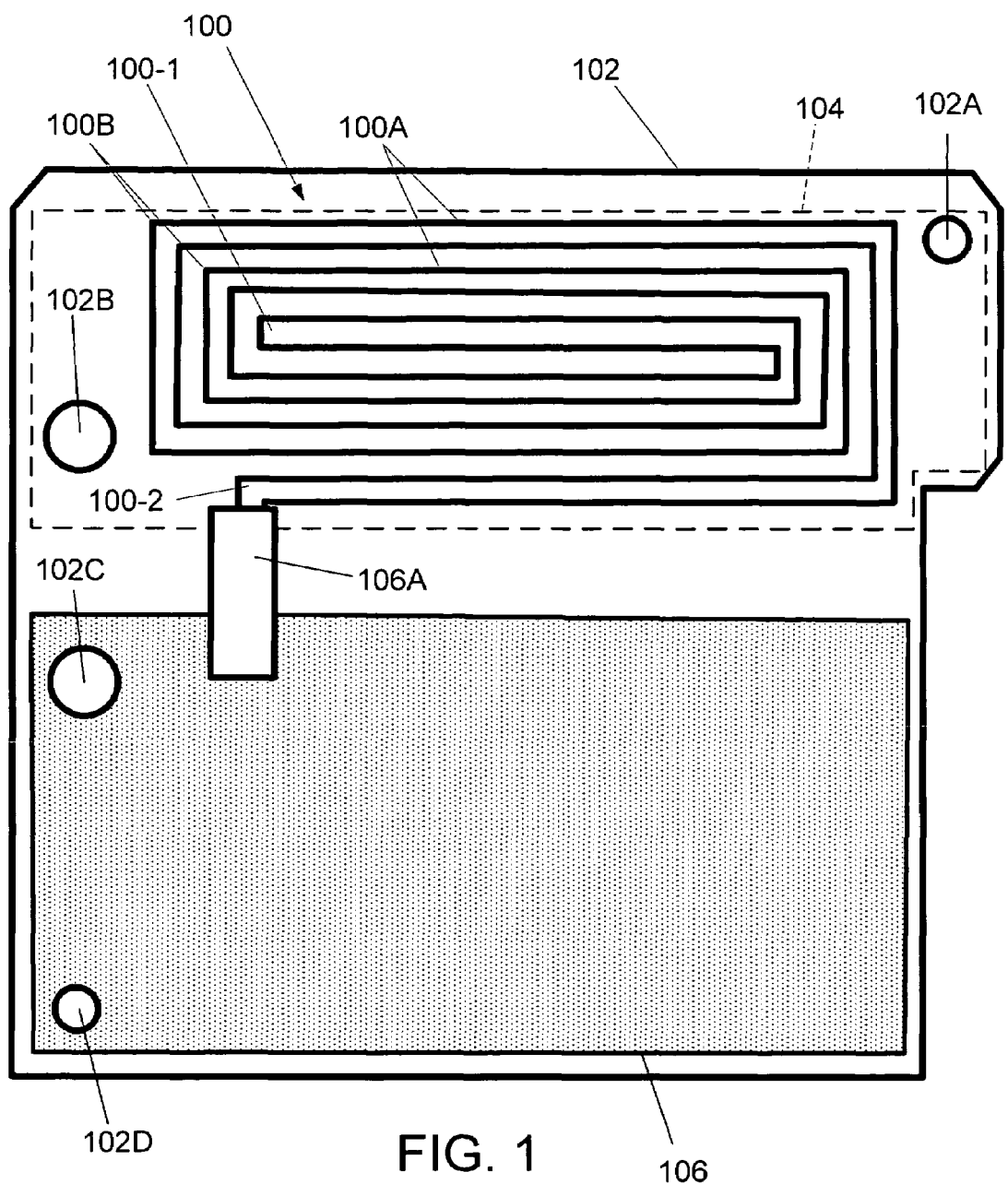
FIG. 1 is a schematic depiction of a PCB on which a square spiral antenna according to an embodiment of the invention is disposed.

FIG. 1 shows an embodiment of the invention which comprises a square spiral shape antenna 100 which is printed directly on a first side of a substrate/board 102 such as PCB (printed circuit board). A ground plane 104 is formed on a second opposite side of the PCB 102. In this embodiment, the ground plane 104 is formed opposite the antenna 100. The square spiral antenna 100 is dimensioned to fit on the PCB 102 in a manner which is not only compact but which provides accurate reception to RF (Radio. Frequency) signals in the desired frequency. In this embodiment the RF is approximately 315 MHz.

As shown, this antenna 100 has straight portions 100A and corner portions 100B. In this arrangement the straight portions 100A have a width to total antenna length ratio of about 1/20. The antenna 100 is, in this embodiment, formed of copper and is printed onto the PCB 102. It should be noted that the invention is not limited to the use of copper irrespective of the fact that it has been used in the formation of the trace on the printed board 102 in this embodiment. It should also be noted that the antenna 100 is not limited to printed traces and can also use a thick film application in the event that the trace is to be printed on a substrate such as alumina.

The antenna has a free end 100-1 and a connection end 100-2. A circuit generally depicted by the numeral 106, is disposed on the same side of the PCB 102 as the antenna 100 and is connected to the connection end 100-2 of the antenna via a connector 106A which minimizes the distance and resistance between the antenna 100 and the circuit 106.

While developing the invention, efforts where made to create an antenna for an RKE (Remote Keyless Entry) system that was very low in cost but had enough antenna gain to met the minimum range requirements of the RKE system. During efforts to render the spiral antenna more compact a square spiral antenna configuration such as shown in the drawing was employed. It was determined that sharp corners on the square spiral configuration produced better reception characteristics. While the mechanism for this is not fully understood at this time, experiments conclusively supported the fact that an improved reception is in fact possible with this configuration.

While the embodiment has been described as being adapted for a RF of about 315 MHz (such as for use in the U.S. and Japan), the invention is not limited and, merely by way of example, the antenna can be arranged to operate at a frequency of 433.92 MHz (such as used in Europe) and up to about 868 MHz). While the present invention finds advantageous applications in remote-keyless entry (RKE) and tire pressure monitoring systems (TPMS) the invention is not so limited and can be used to replace raised antennas (inverted F antenna) by way of example.

The PCB 102 in the illustrated embodiment is provided with four mounting holes 102A, 102B, 102C and 102D. These holes allow for pins/screws to pass therethrough and to accordingly enable the board to be mounted in/to a vehicle chassis, door or the like. Two of these (102A, 102B) pass through portions of the board on either side of the antenna 100, while the other two (102C, 102D) pass through the area in which the circuit which is operatively connected to the antenna, is disposed. These holes have no other function than mounting the PCB 102 in a predetermined position. The numbers can be increased or decreased as required and as space and other pertinent factors permit.

Figure 5:
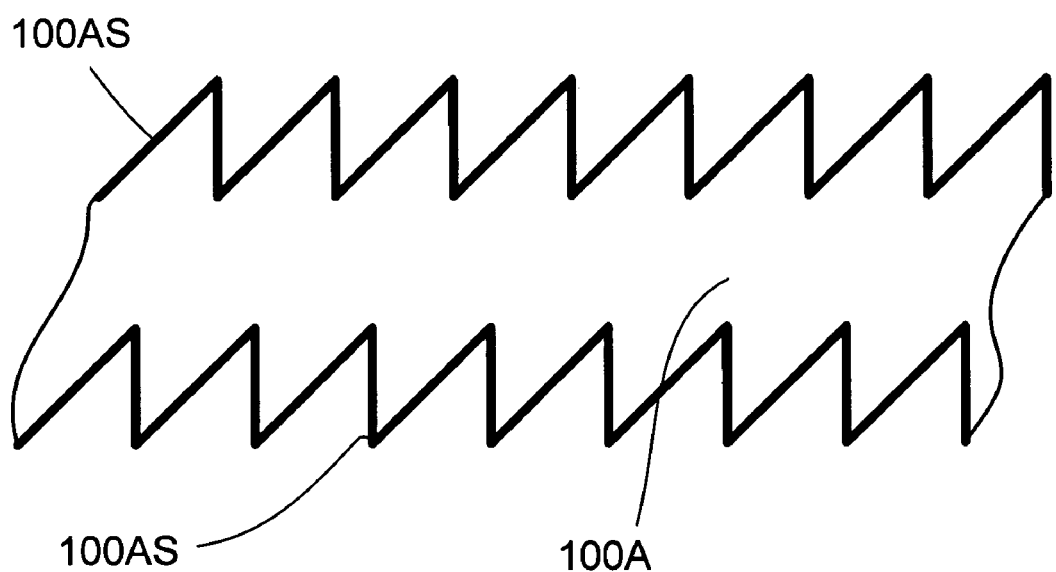
FIG. 5 is a plan view of a portion of an antenna which is provided with a sawtooth configuration in accordance with a variant of the arrangement which is shown in FIG. 1.

Even though the antenna according to the present invention has been described with reference to a limited number of embodiments, the various changes and variations which can be made without departing from the scope of the appended claims, will be self-evident to the person of skill in the related art or that which is most closely related thereto. For example it should also be noted that the invention is not limited to rectangular square type spiral patterns and may employ any other suitable polygonal pattern via which a plurality of corners are generated and which produce desirable reception characteristics. A saw-toothed edging 100AS, for example, can be provided along one or both sides of the straight portions 100A of the antenna shown in the figure in the manner illustrated in FIG. 5.

Figure 2:
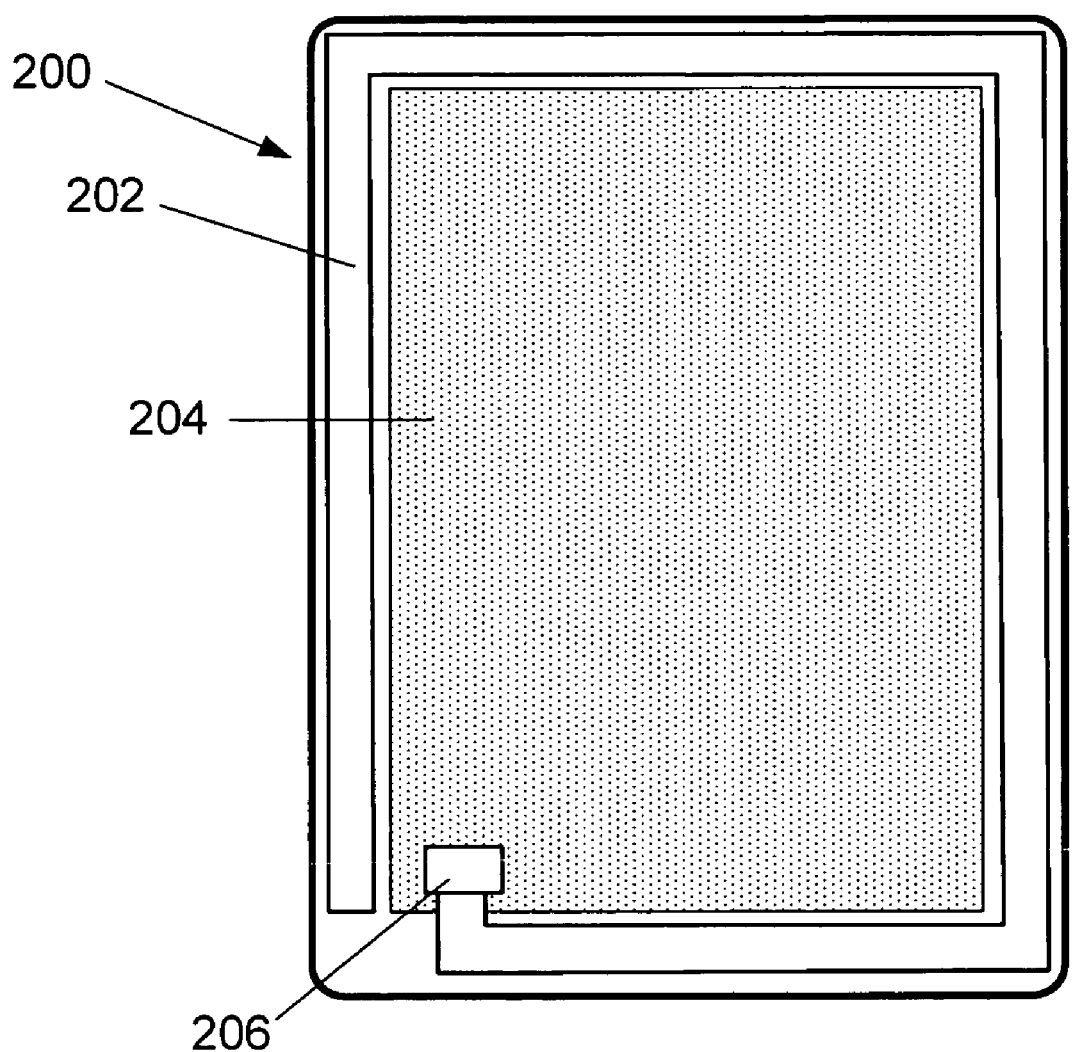
FIG. 2 is a schematic plan view which shows an embodiment of a transmitter unit that can be used in conjunction with the antenna depicted in FIG. 1, and which depicts the manner in which a loop antenna is formed about the periphery of a PCB on which the circuitry of the transmitter is disposed.

FIG. 2 is a schematic plan view of a portable transmitter arrangement 200 that can be used with the antenna embodiment depicted in FIG. 1. In this case the transmitting antenna 202 is arranged around the periphery of the circuitry 204 used to generate predetermined signal emissions such as lock/unlock signals for triggering a corresponding response from a door lock or locks. Of course these signals are not limited to lock and unlock controls and can be used to start the engine, heat the seats or the like. In this embodiment, the emission antenna is disposed about the periphery of the circuit elements of the transmitter to make use of the limited remaining space which is left-within the interior of the portable transmitter, and connected to the circuitry through a low resistance connection 206.

Figure 3:
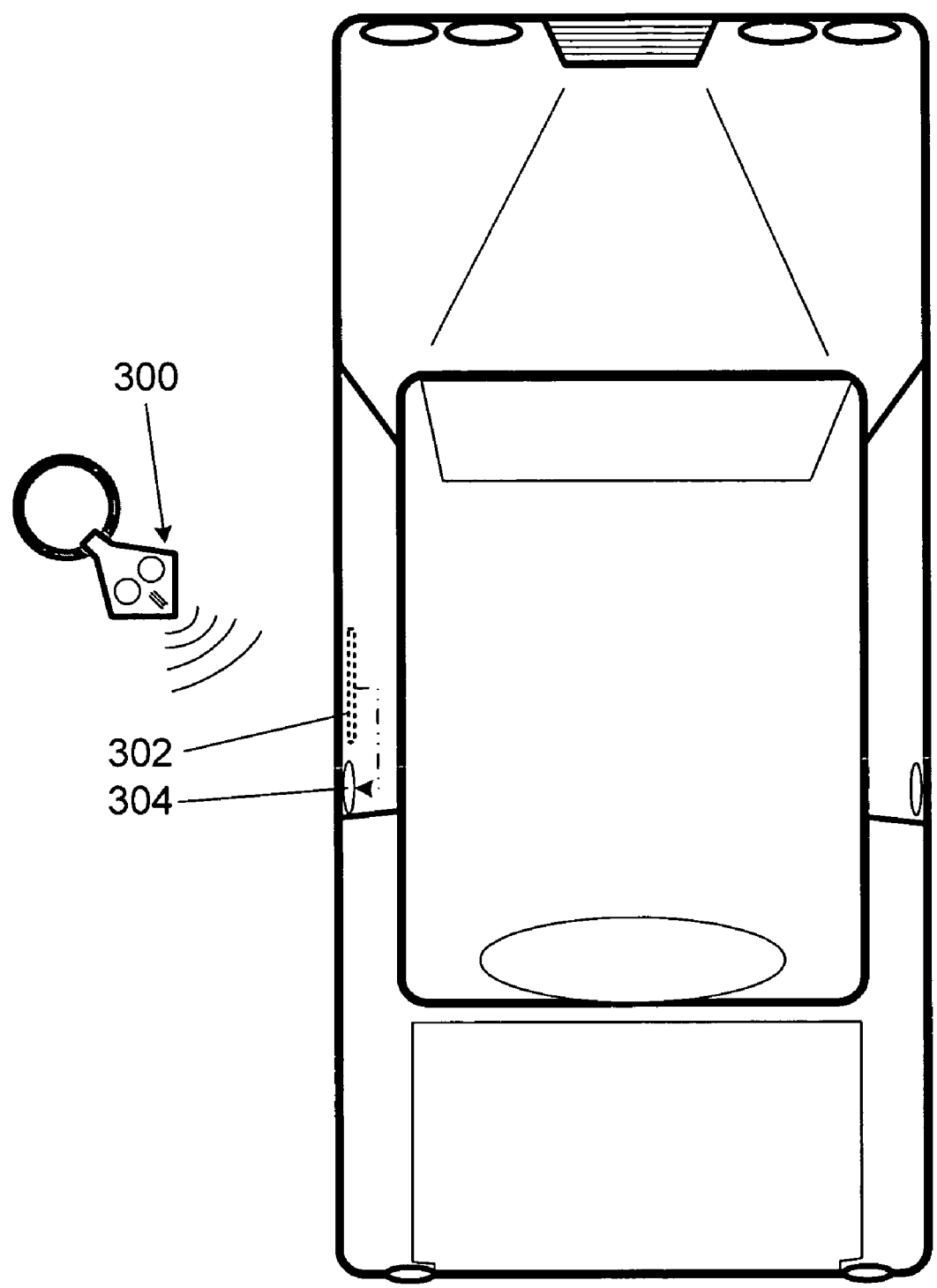
FIG. 3 is a schematic plan view (not to scale) of an automotive vehicle including a PCB provided with an antenna and a portable transmitter according to the embodiments of the invention.

FIG. 3 schematically depicts an arrangement wherein an antenna arrangement such as shown in FIG. 1 with a transmitter 300 such as disclosed in connection with the portable transmitter shown in FIG. 2. In this arrangement the loop antenna which is formed about the periphery of the portable transmitter circuit is shown radiating a signal to a PCB 302 having an antenna of the type depicted in FIG. 1. In this arrangement, the PCB is operatively connected with a lock mechanism 304 in a manner which allows the lock to be operated via remote control.

Figure 4:
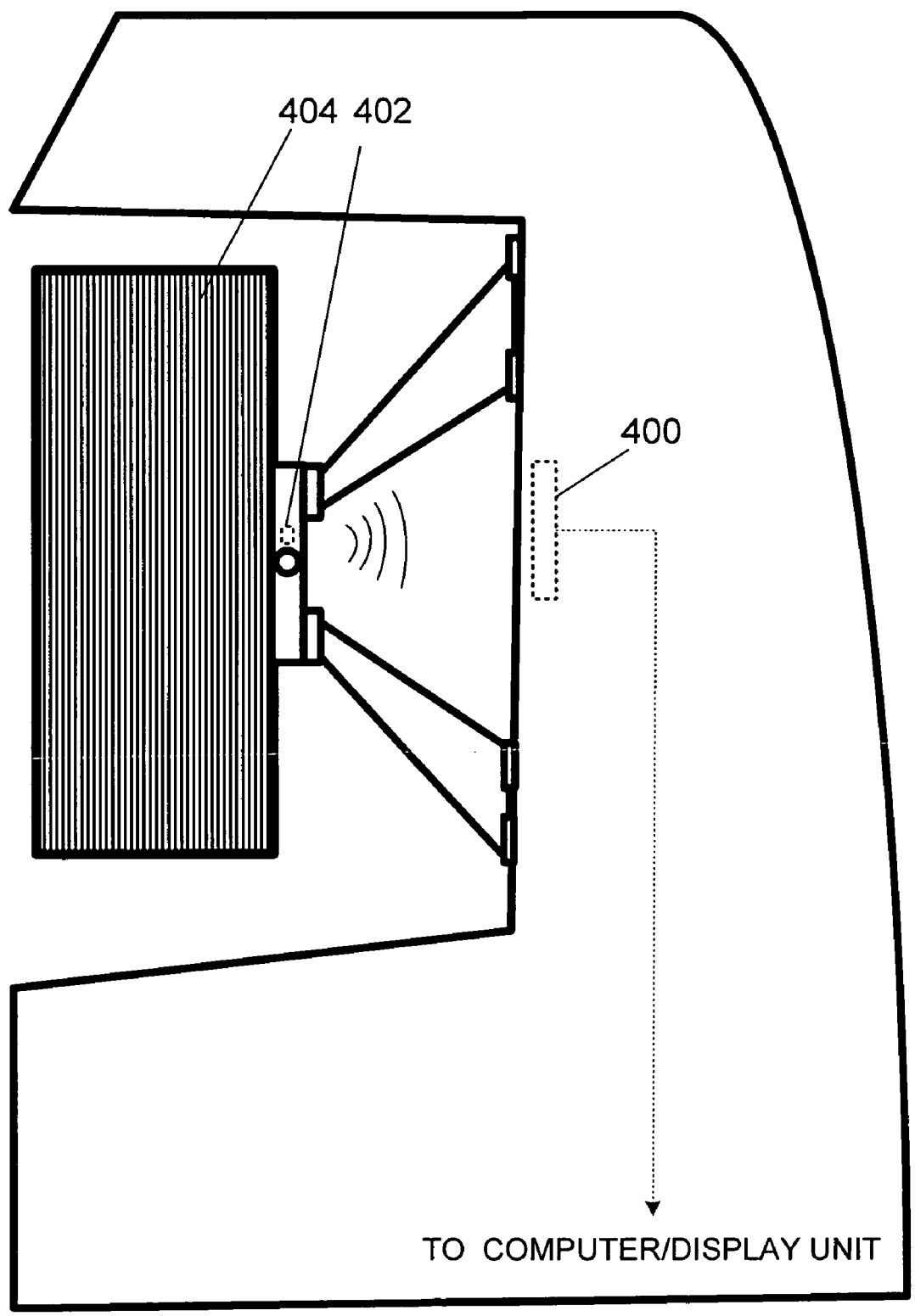
FIG. 4 is a schematic plan view of a vehicle wheel showing a transmitter disposed with the pneumatic tire/road wheel and a PCB which is provided with an antenna according to the embodiments of the invention, and which is arranged with the vehicle chassis so as to receive the signal from the transmitter indicative of the pressure within the tire.

FIG. 4 shows in schematic form an arrangement wherein a PCB 400, which has an antenna such as that shown in FIG. 1, is disposed in a vehicle chassis at a location wherein a signal from a tire pressure sensor 402, which is arrangement to transmit a signal indicative of the pneumatic pressure in the tire 404, is received.

Again, while the present invention finds advantageous applications in the above described remote-keyless entry (RKE) and tire pressure monitoring systems (TPMS) type of arrangements, it will be understood that the invention is limited only by the appended claims and that the various modifications and changes that are possible without departing from this scope will, given the preceding disclosure, be self-evident to the person of skill in the art to which the present invention pertains.

What is claimed is:

1. An antenna arrangement for a RF (radio frequency) signal, comprising:

printed circuit board having first and second opposed sides;

a ground plane formed on the first side of the printed circuit board;

a circuit disposed on the second side of the printed circuit board; and a flat, polygonal shaped spiral member disposed on the second side of the printed circuit board, the polygonal shaped spiral member having a first free end and a second connection end connected to the circuit, the spiral member having a plurality of straight portions which are interconnected to form a plurality of corners.

2. An antenna arrangement as set forth in claim 1, wherein the polygonal shaped spiral member comprises a square spiral and wherein the plurality of corners are sharp corners.

3. An antenna arrangement as set forth in claim 2, wherein the length of the square spiral is less than quarter wave length of the RF which the antenna is adapted to receive.

4. An antenna arrangement as set forth in claim 1, wherein a length to width ratio of the antenna is about 1/20.

5. An antenna arrangement as set forth in claim 1, wherein the circuit is connected to the connection end in a manner which minimizes the distance therebetween.

6. An antenna arrangement as set forth in claim 1, wherein the RF is about 315 MHz and the wavelength is approximately one meter.

7. An antenna arrangement as set forth in claim 1, wherein the wavelength is less than one meter.

8. An antenna arrangement as set forth in claim 1, further comprising a transmitter which is adapted to transmit a signal from a remote location to the antenna.

9. An antenna arrangement as set forth in claim 8, wherein the transmitter is a portable transmitter adapted to carried by a person and which comprises a transmitter circuit and a loop antenna which is disposed about a periphery of the transmitter circuit.

10. An antenna arrangement as set forth in claim 9, wherein the antenna arrangement is disposed in a door of a vehicle and operatively connected with a door lock mechanism to enable keyless unlocking of the vehicle door.

11. An antenna arrangement as set forth in claim 8, wherein the transmitter is disposed in a wheel of a vehicle and operatively connected with a pressure sensor to transmit data indicative of the pneumatic pressure within a tire on the wheel, to the antenna which is mounted in the vehicle to which the wheel is operatively connected.

12. A remote control arrangement comprising:
a rectangular spiral antenna having a free end and a connection end;
a circuit operatively connected to the connection end and adapted to operate a device in response to a signal being received by the antenna; and
a circuit board on which the antenna and the circuit are disposed, and
wherein the printed circuit board is disposed in a door of a vehicle.

13. A remote control arrangement as set forth in claim 12, wherein the circuit is a printed circuit which is printed on first side of the circuit board.

14. A remote control arrangement as set forth in claim 13, wherein the antenna is printed on the first side of the circuit board.

15. A remote control arrangement as set forth in claim 14, further comprising a ground plane formed on a second side of the circuit board which is opposite from the first side on which the antenna is printed.

16. A remote control arrangement as set forth in claim 12, further comprising a portable transmitter which is adapted to transmit a signal to the antenna.

17. A remote control arrangement as set forth in claim 16, wherein the portable transmitter is adapted to be carried by a person and manually manipulated to generate the signal to the antenna.

18. A remote control arrangement comprising:
a rectangular spiral antenna having a free end and connection end;
a circuit operatively connected to the connection end and adapted to operate a device in response to a signal being received by the antenna;
a circuit board on which the antenna and the circuit are disposed; and
a transmitter which is configured to transmit a signal to the antenna, the transmitter being disposed with a wheel of a vehicle and configured to be responsive to a pressure sensor which senses the pneumatic pressure in a tire on the wheel, and to transmit a signal indicative of the sensed pressure, to the antenna.

19. A remote control arrangement as set forth in claim 18, wherein the circuit board is disposed in the vehicle.

20. A method of improving reception of a rectangular spiral antenna which is disposed on a circuit board and adapted to receive a signal from a remote transmitter, comprising:
providing sharp corners at the intersections which interconnect straight portions of the rectangular spiral antenna;
disposing the antenna and a circuit on the same side of a circuit board, and connecting an end of the antenna to the circuit to minimize the distance between the antenna and the circuit; and
disposing a ground plane on a side of the circuit board which is opposite to the side on which the antenna and the circuit are disposed.

21. A method as set forth in claim 20, further comprising providing at least one straight portion of the antenna with a saw tooth configuration which increases the number of sharp corners on the antenna.

22. A method as set forth in claim 20, further comprising transmitting a signal to the antenna using a loop antenna which is wound around structure of a transmitter.

* * * * *